(12) United States Patent
Pao (10) Patent No.: US 8,838,838 B2
(45) Date of Patent: Sep. 16, 2014

(54) UNIVERSAL DRIVING METHOD AND SYSTEM FOR PERIPHERALS

(75) Inventor: Lih-Gwo Pao, Taipei (TW)

(73) Assignee: Arcadyan Technology Corporation, Hsinchu (TW)

( * ) Notice: Subject to any disclaimer, the term of this patent is extended or adjusted under 35 U.S.C. 154(b) by 0 days.

(21) Appl. No.: 13/561,602

(22) Filed: Jul. 30, 2012

(65) Prior Publication Data

US 2013/0297830 A1    Nov. 7, 2013

(30) Foreign Application Priority Data

May 2, 2012   (TW) .............................. 101115567 A (51) Int. Cl.
*G06F 3/00*   (2006.01)

(52) U.S. Cl.
USPC ................................ 710/3; 715/734; 715/760

(58) Field of Classification Search
None
See application file for complete search history.

(56) References Cited

U.S. PATENT DOCUMENTS

| | | | | |
|---|---|---|---|---|
| 6,188,401 | B1* | 2/2001 | Peyer ............................ | 715/805 |
| 7,526,598 | B2* | 4/2009 | Stern et al. .................... | 711/100 |
| 7,743,390 | B2 | 6/2010 | Cheng | |
| 8,510,731 | B2* | 8/2013 | Aiba et al. .................... | 717/176 |
| 2002/0095501 | A1 | 7/2002 | Chiloyan et al. | |
| 2002/0138564 | A1* | 9/2002 | Treptow et al. ............... | 709/203 |
| 2005/0033546 | A1* | 2/2005 | Hamaguchi et al. .......... | 702/141 |
| 2006/0031623 | A1* | 2/2006 | Bando ........................... | 710/313 |
| 2006/0069813 | A1* | 3/2006 | Biamonte et al. ............. | 710/8 |
| 2006/0156302 | A1* | 7/2006 | Yamamoto et al. ........... | 717/174 |
| 2009/0089463 | A1* | 4/2009 | Iga .................................. | 710/37 |
| 2009/0190157 | A1 | 7/2009 | Ferlitsch | |
| 2010/0027041 | A1* | 2/2010 | Kanno ......................... | 358/1.13 |

FOREIGN PATENT DOCUMENTS

EP    1223722    7/2002

OTHER PUBLICATIONS

Beeteson, et al., "Device Drivers via the Access Bus", IBM Technical Disclosure Bulletin, vol. 39, No. 01. Jan. 1, 1996.

* cited by examiner

*Primary Examiner* — Elias Mamo
(74) *Attorney, Agent, or Firm* — Li & Cai Intellectual Property (USA) Office (57) ABSTRACT

Disclosure is related to a universal driving method and a system for a variety of peripherals. For solving the problem in a hardware manufacturer required to provide many versions of drivers and proprietary programs for different host systems and operating systems, the universal driving method allows the host system drives its peripherals via a scripting language. In accordance with the embodiment of the invention, the host system may recognize and connect to a peripheral device via an address while the peripheral device is linked to the host system. After that, a channel is established between the peripheral device and the host system. The scripting language is then used to generate an operating interface for the peripheral device. Users may therefore access the peripheral device through the interface.

11 Claims, 7 Drawing Sheets

UNIVERSAL DRIVING METHOD AND SYSTEM FOR PERIPHERALS

BACKGROUND OF THE INVENTION

1. Field of the Invention

The invention relates to a universal driving method for the various peripherals, more particularly to the method and system which employs the scripting language for every operating system to drive the peripherals.

2. Description of Related Art

A hardware device generally requires its proprietary driver which is additionally made by its manufacturer. The driver is operated to communicate with a host system such as a personal computer, portable device, or similar electronic device. For the user may completely use the functionalities from the different categories of the host systems or operating systems, their own proprietary drivers or operating software may require to be recompiled or rewritten.

The driver for driving the hardware is an interactive program among the host system, software, and hardware, and to establish an interface to communicate the user with the hardware. For example, the Universal Serial Bus (USB) allows the user easily to access or use the USB-compatible device, such as the well-known external CD, hard disk, or memory drive. Even though the host system or operating system supports the USB, there is still an adapted driver built in the operating system.

More specifically, in response to the differences among the various computer framework and operating systems, the various peripherals may require 8-bit, 16-bit, 32-bit, or 64-bit drivers. The operating systems such as Windows™, Mac OS™, and Linux may need the corresponding drivers based on their versions.

The traditional method to drive the hardware may not be applicable to the hardware specification of every host system, or all of the various operating systems. The hardware manufacturer may therefore provide few drivers specified to some main operating systems, in which the drivers may still be proprietary since they are produced by the manufacturer. The conventional driver may not easily be distributed to all of the systems. On the other hand, the manufacturer needs to provide the new drivers for new hardware devices ready to connect with the host system which wants to fully access the hardware.

In the conventional technology, one hardware device generally requires a proprietary driver. Even though the system may be installed with the generic drivers for the new hardware, the proprietary application may still be provided additionally. Moreover, the driver may be constantly and periodically updated because the specification of host system is changed, the operating system is upgraded, or newer environment is provided. The updated driver is required to be upgraded or downloaded. Further, most of the drivers or applications may need to be rewritten and recompiled since they meet the upgraded operating system or changed specification. The above-described conditions may result in high cost and continuous annoyance.

SUMMARY OF THE INVENTION

In view of the hardware manufacturer are required to provide the various versions of the drivers and application programs for the various host systems or operating systems as using a hardware device, provided is a universal driving method for peripherals, and a system using the same. The method particularly employs a scripting language universally executed in the various hosts and operating systems. Provided is a scheme using web browser for users to access the various hardware device by the scripting language.

In accordance with one embodiment of the invention, the universal driving method for the peripheral device is adapted to a host system and its connected peripheral device over a specific interface. Operating system of the host system may recognize the peripheral device by its address when the peripheral device is connected to the host system. The operating system is then allowed to access the peripheral device. The mentioned interface for the peripheral device connected to the host system may be driven by a generic driver installed in the operating system.

A channel may be established for accessing the peripheral device by the operating system when the peripheral device is connected. A scripting language corresponding to the peripheral device is then executed. The scripting language is stored in a memory of the peripheral device. The operating system acquires this scripting language from the memory, and executes the related program.

In an exemplary example, the scripting language may be one type of Markup Languages capable of driving the peripheral device. The Markup Language are such as Hypertext Markup Language (HTML) which is for acquiring the content as accessing the network device, Extensible Markup Language (XML), and Hayes command set (e.g. AT command) for accessing the modem. In the approach, when the peripheral device is driven, the Hypertext Markup Language or Extensible Markup Language is served to create a web-based operating interface. The interface is provided to control or access the operating interface. Since the scheme is web-based service, the operating system is able to recognize the peripheral device by solving the address using Universal Resource Locator (URL).

When the operating system establishes the channel for accessing the peripheral device, a scripting language is executed to create an operating interface that is used to control or access the peripheral device. Any user is allowed to execute a corresponding operating procedure by conducting one or more operating icons on the operating interface. For example, if the peripheral device is a storage device, the operating interface is provided for the user to browse, delete, add, or edit the files in the storage device.

A system performing the above-describe universal driving method includes the peripheral device having a scripting language, and a host system the device is connected over a connection interface, such as USB.

The host system is exemplarily a computer system. The system at least includes a central processing unit, and an input/output control unit, an I/O port, and a storing unit. The input/output control unit is configured to control one or more connection ports. The input/output control unit also establishes the connection between the host system and peripheral device. The storing unit stores operating system program for operating the host system, the generic driver for driving the port of the host system, and a user interface program. The peripheral device is connected to the host system and meanwhile acquiring the scripting language there-from. The operating system executes the scripting language for driving the peripheral device.

According to one of the embodiments, the scripting language is used to create an operating interface for the peripheral device as the peripheral device is with a connection interface such as Universal Serial Bus. The operating interface is provided for the user to access the peripheral device.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Disclosure is related to a peripheral device, a universal driving method for peripherals, and a system for the same. The universal driving method preferably employs the scripting language to drive the peripheral device connected to the host system. The scripting language is such as web-enabled Hypertext Markup Language (HTML), Extensible Markup Language (XML), or Hayes command set for controlling the modem. The method allows the hardware manufacturer to drive its provided hardware to be adapted to the various operating platforms by the scripting language universally applicable to different hosts and operating systems rather than a plurality of version of drivers and applications are required to the various host systems or operating systems according to the conventional way.

Figure 1:
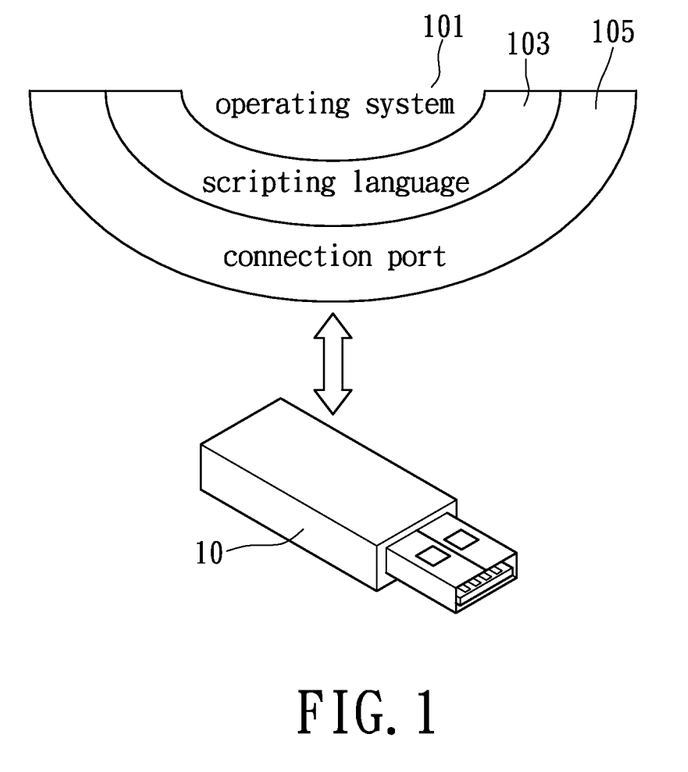
FIG. 1 shows a schematic diagram of the universal driving system for the peripheral device in accordance with the present invention.

The system framework incorporating the universal driving method for the peripheral device according to the present invention is referred to the schematic diagram shown in FIG. 1.

A framework of the host system is described in the figure. In the traditional technology with the proprietary driver used to drive the hardware, the kernel of the framework is the operating system 101 installed in the host system. The operating system 101 is usually used to process the operations and data processing among the software and hardware. In accordance with the present invention, this exemplary example allows a common driver (not shown) to manage the devices connected to the system via the I/O ports, that means the mentioned scripting language 103 adapted to the various platforms are used to drive the peripheral device 10 through the connection port 105.

The universal driving method in this disclosure for driving the peripheral device is disclosed. The framework disclosed in the FIG. 1 is introduced to conduct this method for driving the peripheral device 10, rather than the traditional driving method applied in the operating system 101 using the proprietary driver. Therefore, in accordance with the present invention, merely one scripting language is particularly provided for the hardware manufacturer to drive its product. It is advantageous that the manufacturer may not need to write the various driver and the related applications for the multiple operating platforms. The aspect of the present invention reduces the reliability of the operating platforms.

According to one of the embodiments of the invention, the scripting language for driving the peripheral device may be implemented by the Markup Language such as HTML or XML widely compatible over the various web browsers. The scheme allows users to directly access the peripherals through the web browsers. One of the aspects of the invention is to regard the peripheral device as a network device. The web browser has resolved the protocol for the conventional network device. The web browser may therefore recognize the peripheral device through URL since it designates the device's connection port. The operating system is allowed to connect and control the peripheral device through web browser. The aspect is rather than the proprietary driver provided to drive the peripheral device in the traditional technology.

Figure 2:
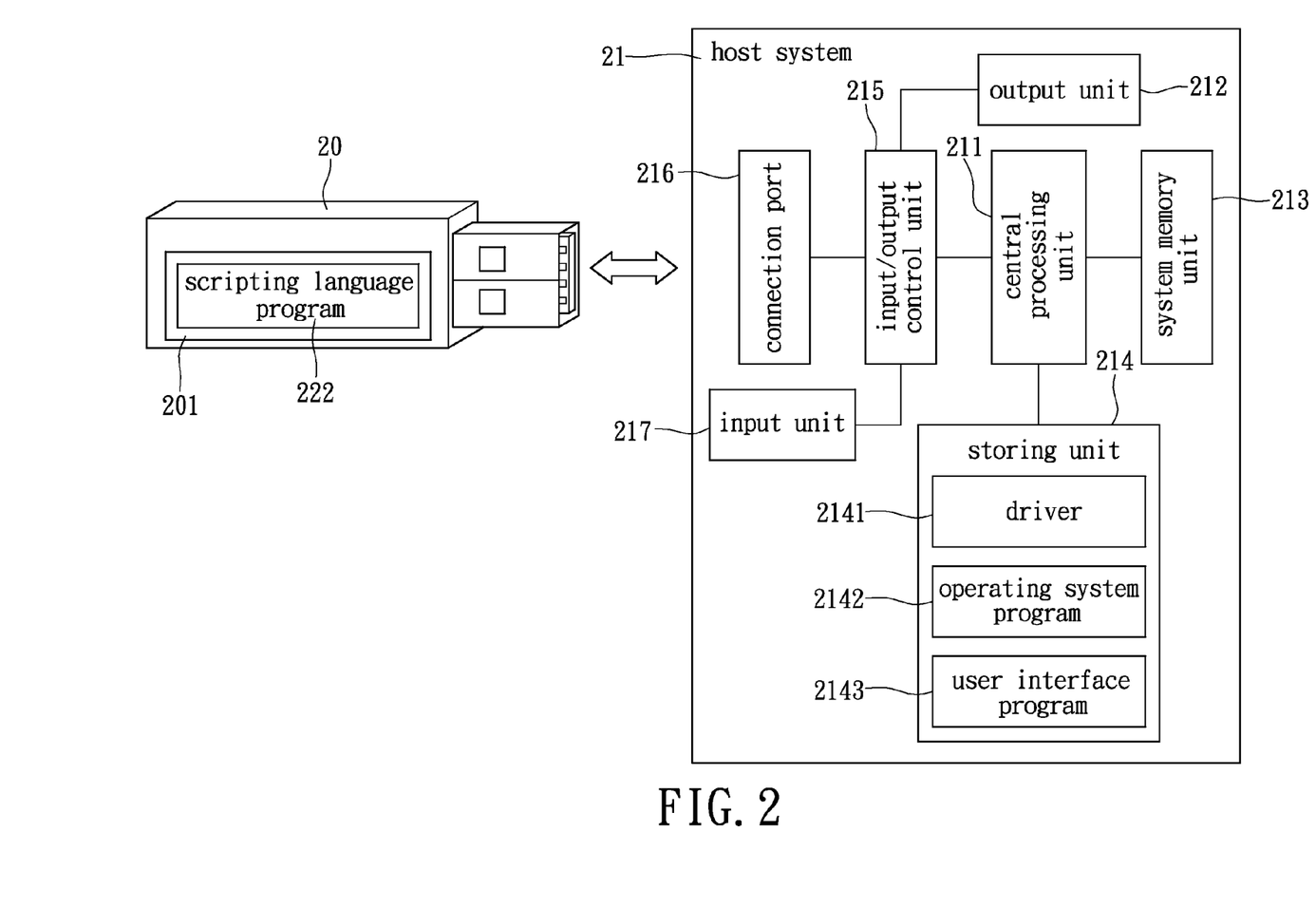
FIG. 2 is a schematic diagram describing the universal driving system for the peripheral device in accordance with the present invention.

FIG. 2 schematically describes the universal driving system for integrating the drivers of the peripheral device.

A peripheral device 20 is shown to connect to a host system 21. The peripheral device 20 may be an external device connected to the host system 21. For example, the external storage device, CD drive, A/V device, or communication device may embody the peripheral device 20. A memory 201 for storing the scripting language program 222 is provided. The scripting language program 222 indicates the driver and the related application provided by the manufacturer of the peripheral device 20. The scripting language adapted to the various operating platforms is such as HTML, XML, AT command set, or other similar scripts. The manufacturers may not write any new drivers or applications for the various platforms based on the aspect of the invention.

The host system 21 can be a computer system, portable device or an electronic device capable of connected to the external device. In the embodiment, the host system 21 includes a central processing unit 211 and its electrically connected system memory unit 213, storing unit 214, and input/output control unit 215.

The input/output control unit 215 is a control circuit for managing the I/O ports of the host system 21. The input/output control unit 215 is electrically connected to the output unit 212 for controlling the output signals of the display, lights, or sounds. The input/output control unit 215 is electrically connected to the input unit 217 for conducting the input signals including the signals made by buttons, keyboard, computer mouse, or touch panel. The input/output control unit 215 is electrically connected to the connection port 216 of the host system 21, and is such as Universal Serial Bus (USB), Peripheral Component Interface (PCI), IEEE 1394, RS232, or Thunderbolt. The connection port 216 is preferably the type of universal connection interface built in the host system 21. The relevant generic drivers are built in the operating system.

The storing unit 214 may be a kind of non-volatile memory in the system. The storing unit 214 is used to store data, programs, and also the drivers 2141 for the various connection ports, operating system program 2142 for system operations, and the tool programs for accessing the peripheral devices 20. The tool programs may conduct the user interface programs 2143.

When the host system 21 is in operation, the related operating system program 2142 is retrieved from the storing unit 214, and installed into the system memory unit 213, e.g. RAM. An interactive operating environment is then established for communicating the peripheral devices 20. The connection interface for each peripheral device 20 can be therefore recognized. A generic driver 2141 is executed. Further, a scripting language program 222 is executed to conduct the driving tasks, and create operating interfaces as required. For example, the operating interface is made by executing a user interface program 2143.

In the present example, the peripheral device 20 includes a connection port 21, by which the peripheral device 20 is connected to the host system 21. The system 21 may receive a connecting signal indicative of the device 20 is connected to system 21 from the input/output control unit 215. The central processing unit 211 may execute a corresponding driver 2141 ready for the peripheral device 20 as acknowledging the connecting signal. In the meantime, a scripting language program 222 is also executed to access the peripheral device 20. The user interface program 2143 may initiate a web browser, and execute the scripting language such as the Markup Language, for example HTML or XML. This aspect using the scripting language with the web browser has resolved the network protocol for processing the network packets in the operating system. The process may resolve the address (URL) and signal processing. Therefore, in one embodiment, the peripheral device 20 is recognized by its address, such as the URL (Universal Resource Locator) being recognizable to the web browser.

In FIG. 2, the universal driving system for peripherals at least includes the peripheral device 20 storing the scripting language program, and the host system 21. A connection interface is provided to link the peripheral device 20 and the host system 21. The link shall be embodied by the regular interface but not be limited to wired or wireless connection.

A channel for accessing the peripherals is established when the host system 21 is connected with the peripheral device 20. A generic driver in the operating system may be used to make the link to the peripheral device 20. The address of the device 20 is used to recognize the hardware link by the operating system. Therefore, the operating system may firstly retrieve the scripting language program from the peripheral device 20. The related scripting language is used to describe the peripheral device 20. The operating system then executes the scripting language for driving the peripheral device. The scripting language is able to create an operating interface for the peripheral device 20 through a user interface program 2143.

Figure 3:
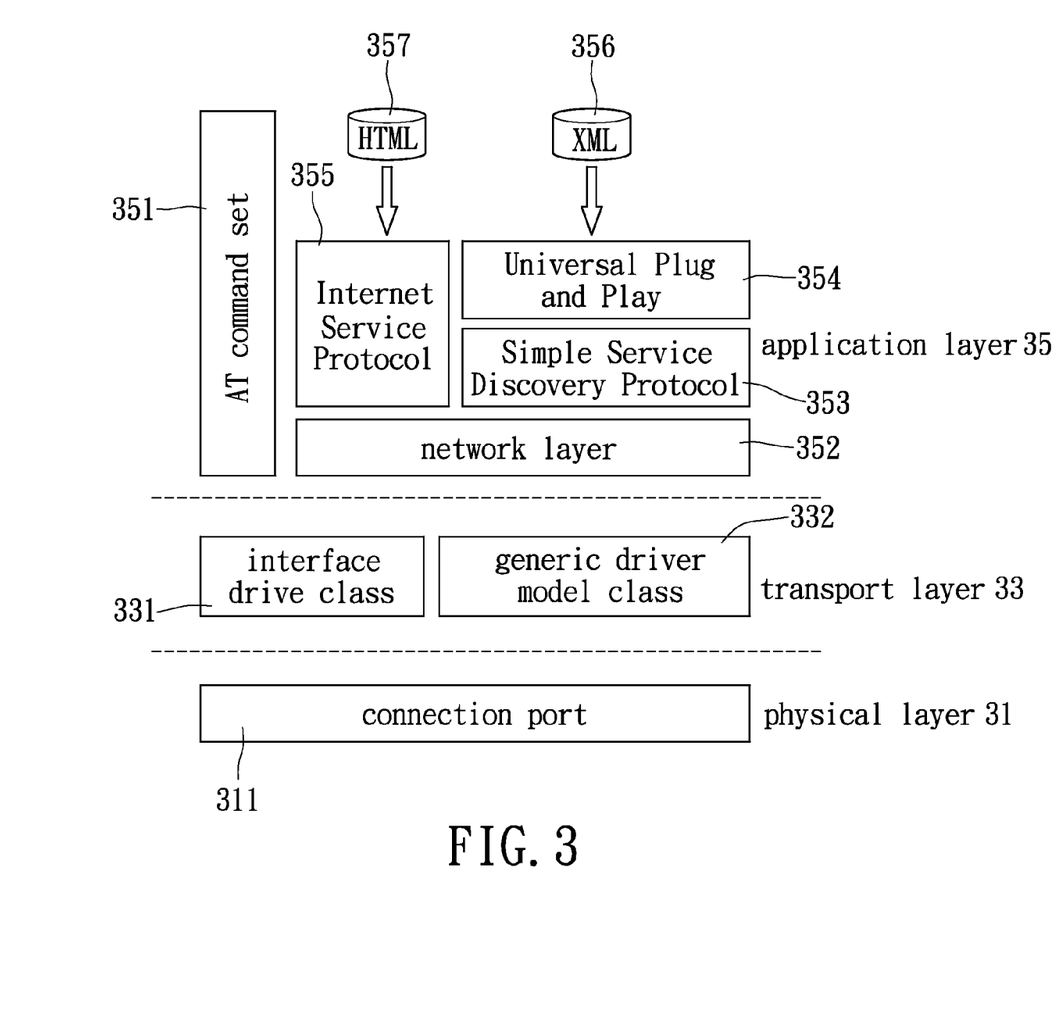
FIG. 3 is a diagram of model describing the generic driver of the present invention.

The method using the generic driver and the device's scripting language is to access the peripheral device; FIG. 3 shows the schematic diagram of this model.

The framework of the generic driver includes a physical layer 31, a transport layer 33, and an application layer 35. The physical layer 31 indicates a physical connector 311 such as USB or the like, and the connector 311 may not be limited for wired or wireless connection in accordance with the invention.

The information regarding the peripheral device is retrieved from the physical layer 31, and delivered to the transport layer 33. The operating system includes a generic driver with respect to the standard interface, and for driving the peripheral device connected to the host system via the standard interface. The transport layer 33 then conducts the data transmission and data control.

The transport layer 33 configures the protocol in the midst of the physical layer 31 and the application layer 35. The transport layer 33 controls the data transmission. For example, the transport layer 33 may resolve the data into packets, and annotate each packet with tracing number, source and destination. The transport layer 33 makes sure the data can be delivered correctly and orderly.

The transport layer 33 is in an important position of the present invention. The transport layer 33 is served to process the interface drive class 331 and generic driver model class 332 for various interface standards. In one exemplary example, the interface drive class 331 is used to process the data packets over the communications device class (CDC), such as USB, and network driver interface specification (NDIS).

In an exemplar example of processing the USB data, the communications device class is a USB subclass specified to the communication devices. The communications device class is able to process voice and data packets. The network driver interface specification class is indicative of an interface standard which is used to be a network driver port for the operating system. Any transmission driver compatible with this network driver interface specification class is able to exchange signals with the related network adapter driver.

After the data packets are processed by the transport layer 33 over the standard interface, the application layer 35 conducts a service interface between the hardware and the operating system. The operating system is allowed to exchange data with other applications by this link. In the present example, the application layer 35 includes a network layer 352 which is used to process the network protocol including TCP, UDP, and IP. The application layer 35 is to establish a communication interface between the user and network device, and also provides a human interface for the various network applications.

Reference is made to FIG. 3. The scripting language for driving or describing the peripheral device is such as AT command set 351 which is generally to communicate the operating system with the hardware. AT command set also names Hayes command set. The AT command set are set of commands using prefix "AT", and used to form the long command by combining some shorter text strings. The commands formed of AT command set are for a series of operations such as dialing, hanging up, and changing the parameters of the connection. Most modems follow the specifications of AT command set. AT command set can be one of the scripting languages for driving the peripheral device in accordance with the present invention. Therefore, the peripheral devices supporting this scripting language may easily operate over the operating platforms of hardware or software.

Furthermore, in an exemplary example, the scripting language for driving or describing the peripheral device may be formed using Hypertext Markup Language 357. Hypertext Markup Language 357 is a widespread script used to describe a web page, and is a cross-platform scripting language. The scripting language allows the various platforms to drive the peripheral device. Through a web browser, the scripting language is executed to control and access the peripheral device. In the model of generic driver, the Hypertext Markup Language 357 communicates with the network layer 352 through an Internet Service Protocol 355. The scheme of the invention is to access the peripheral device through the network layer 352, transport layer 33, and physical layer 31.

In one further embodiment of the present invention, the scripting language used to drive or describe the peripheral device may be scripted by Extensible Markup Language (XML) 356. Extensible Markup Language 356 is a cross-platform script usually used to describe web pages. The scheme using this scripting language allows the different platforms to drive the peripheral device and provide operating interface without need of additional effort of compiling or writing any proprietary driver and application.

As the diagram shows, Extensible Markup Language 356 communicates with the network layer 352 through specifications of Universal Plug and Play (UPnP) 354, Simple Service Discovery Protocol (SSDP) 353, and Internet Service Protocol 355. The various platforms are able to access the peripheral device over the network layer 352, transport layer 33, and physical layer 31.

In which, the Universal Plug and Play 354 is a technology based on the TCP/IP widely used in Internet and local area network. UPnP 354 provides feature of plug and play when the peripheral device is connected to the host system, and furthermore extended to the use over the network. The host system supporting Universal Plug and Play (UPnP) 354 is allowed to detect the connected peripheral device as following this specification of Universal Plug and Play. The connected peripheral device may be automatically set to be available, including setting its IP address. The Universal Plug and Play 354 in accordance with the present invention is preferably to define a standard interface for integrating the various peripherals.

The specification of Universal Plug and Play 354 introduces a General Event Notification Architecture (GENA) which is configured to transmit messages of the various resources such as the host and peripherals under network architecture. When the GENA is in company with the mentioned Simple Service Discovery Protocol (SSDP) 353, provided for the user to browse the peripheral devices conveniently.

SSDP 353 has defined the way to identify the network services over the network, and also configured to store the format of XML document. SSDP 353 is allowed to control the peripheral devices following UPnP standard. The peripheral device may show its existence by broadcasting messages. By which, the universal driving method for peripherals may firstly retrieve a list of the peripheral devices that are connected with the host system in response to the messages the peripherals broadcast.

It is noted that the method regards the peripheral device connected to the host system as a network device. The scripting language originally for network activities is used to drive the peripheral device. The invention may not be limited to use the scripting language but also other executable computer language. For example the scripts widely used for web development at the client end may also embody the scripting language.

For example, a user initiates a user interface such as a web browser, and the user interface may directly handle the protocol of the standard interface. The host system may therefore provide the user to browse the peripheral devices connected to the host system. The peripheral device can be recognized by the device's ID, address or/and name. The scripting language is served to control or access peripheral device via the interface standard.

In an exemplary embodiment as using the web browser, the peripheral devices connected to the host system may be easily browsed in response to each device's broadcasting address as initiating the web browser. While any device is selected, a scripting language with respect to the selected peripheral device is served to provide services of browsing the directories and files. Furthermore, by this scheme, the user may acquire privilege to edit, delete or write content into the directories or files through the operating interface.

Figure 4:
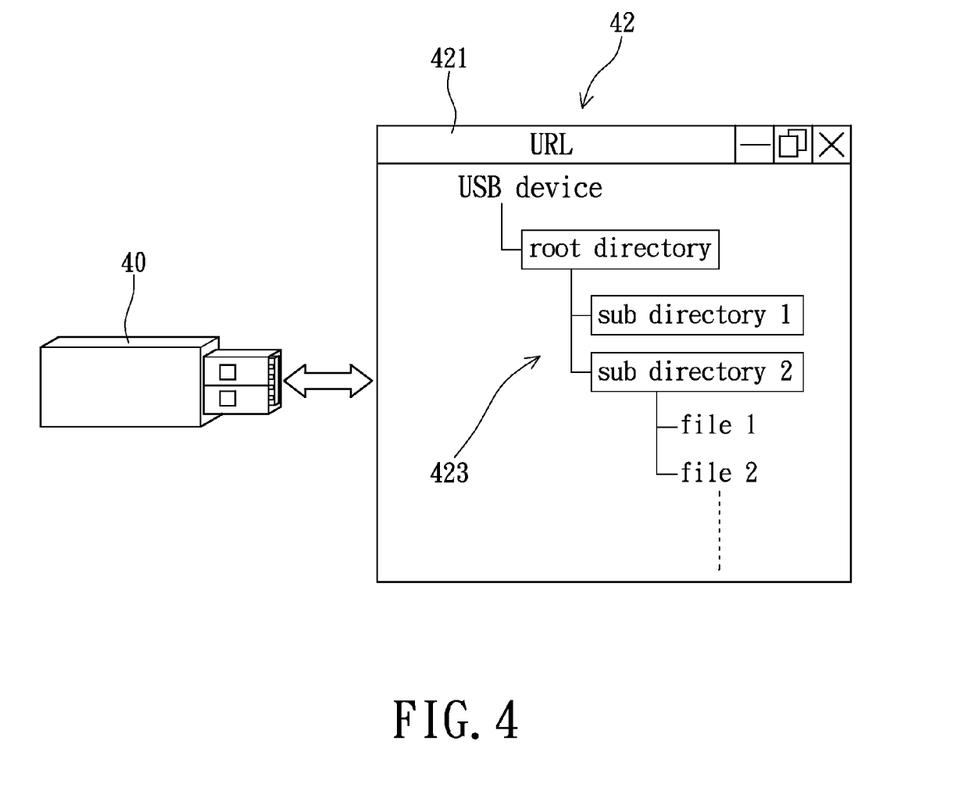
FIG. 4 is a schematic diagram describing the method for accessing the hardware.

Reference is made to FIG. 4 schematically showing a diagram of the hardware being accessed by the driving method. The left side of the diagram shows a peripheral device 40 with USB interface. For example, the peripheral device 40 is such as a flash drive. The right side shows a web browser 42. The field of address 421 indicates of position of the peripheral device 40. The traditional recognized location directed to the storage is preferably replaced by URL in this example. The browsing content 423 exemplarily includes the directories and files for every class of this USB device. It is noted that the browsing method is not limited to this example.

In the present embodiment of the invention, the operating system initiates the web browser 42, and recognizes the peripheral device 40 connected to the host by its Universal Resource Locator (URL). The operating system therefore regards this peripheral device as a device over the network. The aspect of the present invention, rather than the traditional operating system which requires hardware driver, allows the OS to access the peripheral device as the usual way to access the network resource.

Figure 5:
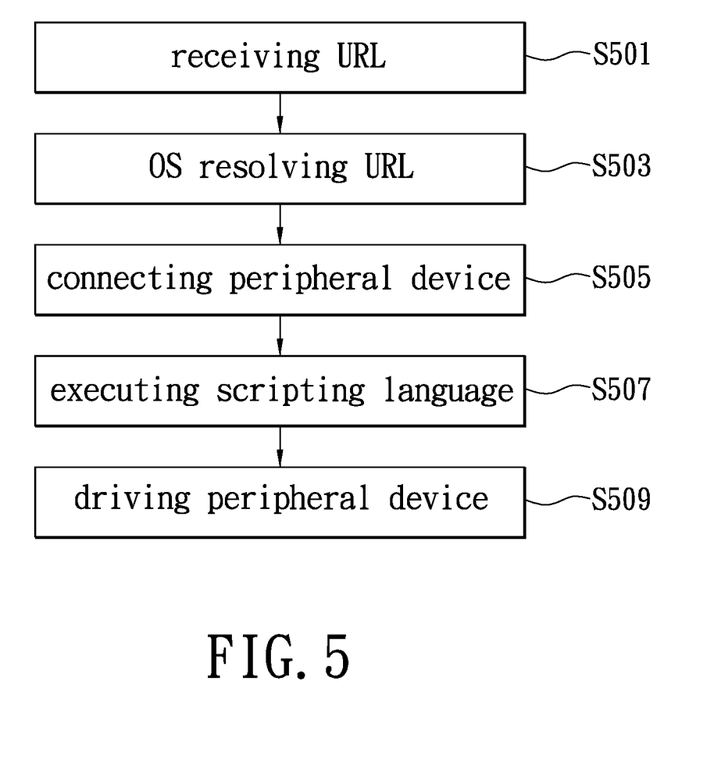
FIG. 5 is a flow chart describing the method for driving the peripheral device using its address in accordance with the present invention.

FIG. 5 shows a flow chart describing the method for driving the peripheral in response to address.

Since the operating system regards the peripheral device as a network device, the user may access the peripheral device when inputting an address such as the network-enabled URL onto a web browser. The operating system may therefore receive this address (step S501). The operating system may resolve this address (step S503), and establish a channel for accessing the device. The peripheral device is connected in response to the resolution of the address (step S505). The scripting language can be retrieved when the peripheral device is connected to the host system, and the scripting language is executed (step S507). The operating system serves the user to access the peripheral device when the peripheral device is successfully driven (step S509).

Figure 6:
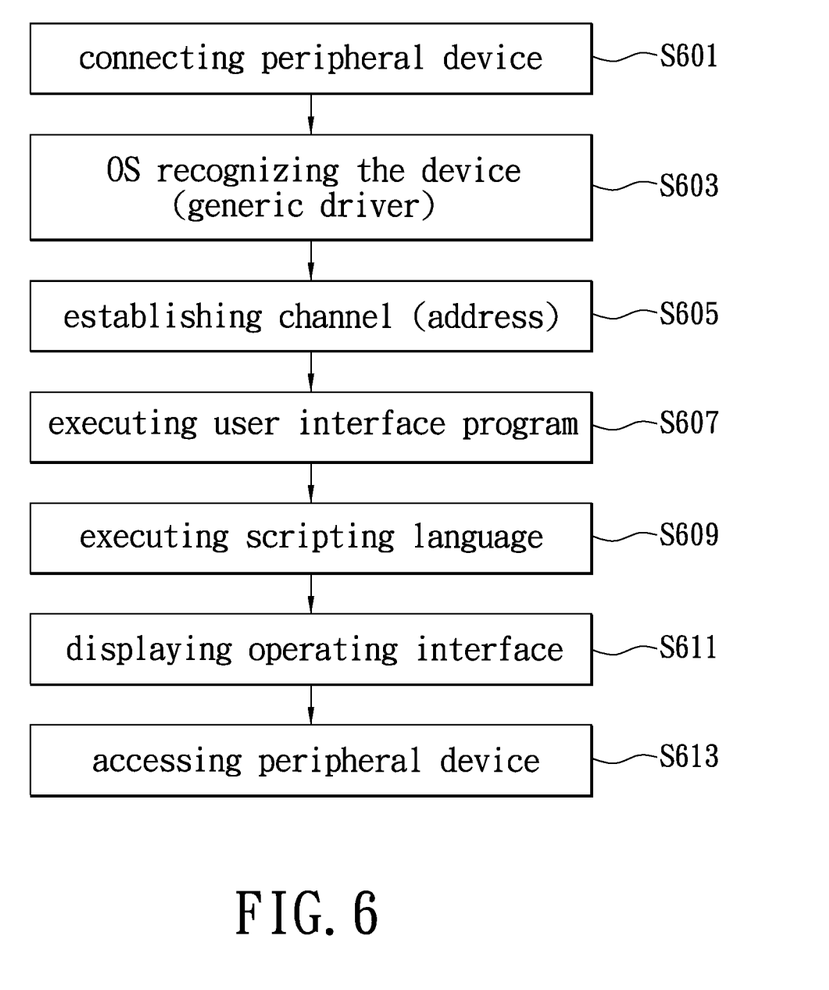
FIG. 6 is a flow chart describing the method for accessing the peripheral device in accordance with the present invention.

The flow chart shown in FIG. 6 describes the method for accessing the peripheral device in accordance with the present invention.

In the beginning of the flow, such as step S601, a peripheral device is connected to a host system, and an operating system may regard the peripheral device as a device over the network. The device can be recognized and connected by its network address. The peripheral device and the host system are connected via a connection interface. The operating system recognizes the peripheral device by generic driver (step S603).

The operating system establishes a hardware channel in response to the peripheral device's address (step S605). The channel is established by this generic driver. By which, the operating system retrieves the scripting language program stored in the memory of the peripheral device. The operating system then executes the scripting language, and links to the library of operating system programs. The program library links to bottom-layer hardware driving codes and operating procedure of the hardware is correspondingly driven.

Next, such as step S607, the operating system executes a user interface program, and initiates a user interface. The OS then executes the device's scripting language (step S609). An operating interface may then be displayed using the user interface (step S611). The operating interface is served to access the peripheral device (step S613). By this scripting language, users are allowed to access the device. Particularly, the user interface is configured to provide the operating environment for the users to access the device, including the operations of reading or writing, and configuring reading or writing privilege to the hardware.

When a storage device is connected to a computer host, exemplarily via USB port, operating system activates a corresponding connection port that the device is connected, and executes a user interface program for initiating a browsing interface. The web browser is a preferred solution for creating the browsing interface. The user interface program then shows an operating interface by executing the device's scripting language. The web browser makes the user interface program describe the hardware connected to the host system by means of the web-enabled Universal Resource Locator.

The operating interface allows the user to access the storage device, including the operations of switching directories, reading, editing, deleting and writing files. For example, when the user clicks a button on the web page, the user interface program is activated to execute the corresponding scripting language. The scripting language is charge of communicating the operating system with the hardware for driving the hardware, such as changing state of the magnetic regions of the storage device.

Further, when the user enters the operating interface, the scripting languages for each or multiple peripheral devices are employed to create a plurality of operating icons, which are selected to operate the various operating procedures. FIG. 4 shows the icons visualizing the operations such as browsing the files in the device. The driving method may be referred to the flow chart shown in FIG. 7.

Figure 7:
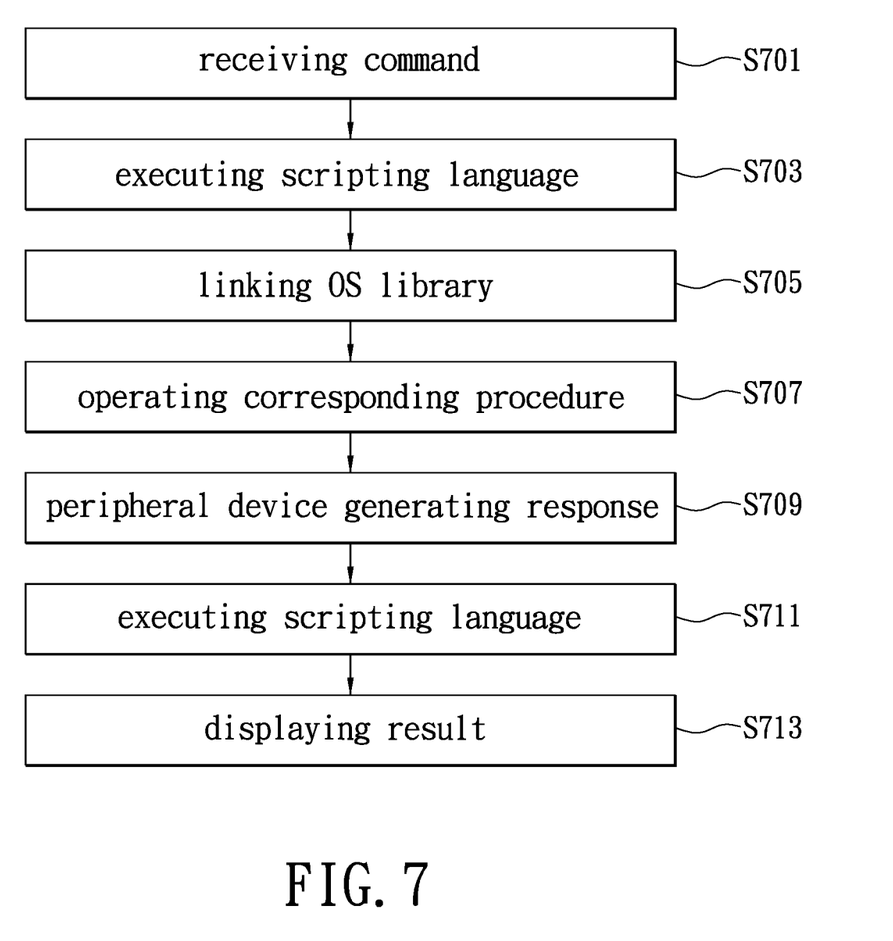
FIG. 7 is a flow chart describing the operating command to conduct the driving method in accordance with the present invention.

The user uses the operating interface to conduct some operations (step S701), and the operating system receives the corresponding commands (step S703). The scripting language for the related device is used to interpret the commands and perform the corresponding operations.

The scripting language is executed to link the operating system to the relevant program library (step S705). The operating system may then operate the related operating procedures (step S707). For example, the OS operates a procedure of deleting a file stored in the storage device. Instantly, the OS may directly access the magnetic regions associated with the file to be deleted. By changing the state of the magnetic regions, the file is operatively deleted. The peripheral device will send a response while any operation is executed. The response includes the signal indicative of checking if the operation is privileged or completed. The execution of scripting language may also be one of the responses (step S711). The scripting language is allowed to describe the procedure operative to the device's response, and shows a figure expressed by the user interface. The visualized result is then generated (step S713).

According to the embodiment of the universal driving method and system in accordance with the present invention, the peripheral device includes its own scripting language. Operating system may receive a signal through its supporting or build-in driver of connection port when the peripheral device is connected to the host system. The driver in this stage means the generic driver widely used in various operating platforms. The generic driver is served to establish a channel allowing the OS to access the peripheral device. In one aspect of the present invention, scripting language such as made by HTML, XML, or AT command set is used for the manufacturing to provide the way to access the peripheral device without any need of proprietary driver specified to hardware. Rather, the way to access the network device is introduced to accessing the peripheral device proximally connected to the host system, and processing the intervening signals.

It is intended that the specification and depicted embodiment be considered exemplary only, with a true scope and spirit of the invention being indicated by the broad meaning of the following claims.

What is claimed is:

1. A universal driving method for peripherals, for driving a peripheral device connected to a host system, and the peripheral device including a connection interface, and the host system including a connection port of the connection interface connected to the peripheral device, comprising:
   connecting with the host system and the peripheral device;
   executing an operating system program installed in the host system for recognizing the peripheral device through Universal Resource Locator which is used to resolve the peripheral device's address;
   accessing the peripheral device for acquiring a scripting language stored in the peripheral device, wherein the scripting language is Markup Language for driving the peripheral device;
   establishing a channel configured to access the peripheral device;
   executing the Markup Language;
   initiating a web-based user interface allowed to control or access the peripheral device by executing the Markup Language; wherein the user interface is an operating interface created by a web browser executing the Markup Language; and
   driving the peripheral device.

2. The driving method according to claim 1, wherein the step of driving the peripheral device including:
   the Markup Language executed by the operating system program connecting to an operating system's program library;
   the operating system's program library connected to bottom-layer hardware driving codes; and
   executing an operating procedure corresponding to the peripheral device.

3. The driving method according to claim 1, wherein the Markup Language is Hypertext Markup Language (HTML), Extensible Markup Language (XML), or Hayes command set.

4. The driving method according to claim 1, wherein the connection port is Universal Serial Bus (USB), Peripheral Component Interface (PCI), IEEE 1394 interface, RS232 interface, or Thunderbolt interface.

5. The driving method according to claim 1, wherein the channel provided to connect to the peripheral device is established by a generic driver linked to the operating system program.

6. The driving method according to claim 5, wherein the generic driver is a driver for Universal Serial Bus.

7. The driving method according to claim 1, wherein the operating interface includes one or more operating icons corresponding to one or more operating procedures processed by the Markup Language.

8. A peripheral device driven by the universal driving method according to claim 1, wherein the peripheral device includes a memory storing the Markup Language.

9. A universal driving system for peripherals, for driving a peripheral device connected to a host system, comprising:
   the peripheral device, storing a Markup Language, further comprising a connection interface;
   the host system having a connection port of the connection interface of the peripheral device, further comprising:
      an input/output control unit, for controlling operation of the connection port;
      a storing unit, for storing an operating system program operating the host system, and a generic driver for driving the connection port;
   wherein, when the host system is connected to the peripheral device, the operating system program is executed for recognizing the peripheral device through Universal Resource Locator which is used to resolve the peripheral device's address, and acquiring the Markup Language; the operating system program operates the generic driver for establishing a channel linked to the peripheral device, which is driven by the operating system program executing the Markup Language and also initiating an operating interface through a web browser for recognizing, controlling and accessing the peripheral device using the Markup Language.

10. The driving method according to claim 9, wherein the connection port is Universal Serial Bus (USB), Peripheral Component Interface (PCI), IEEE 1394 interface, RS232 interface, or Thunderbolt interface.

11. The driving method according to claim 9, wherein the Markup Language stored in the peripheral device is Hayes command set, Hypertext Markup Language, or Extensible Markup Language.

\* \* \* \* \*